H. G. DAVIS.
METAL WORKING APPARATUS.
APPLICATION FILED APR. 30, 1917.

1,275,867.

Patented Aug. 13, 1918.
9 SHEETS—SHEET 1.

WITNESSES

INVENTOR.
Henderson G. Davis
BY

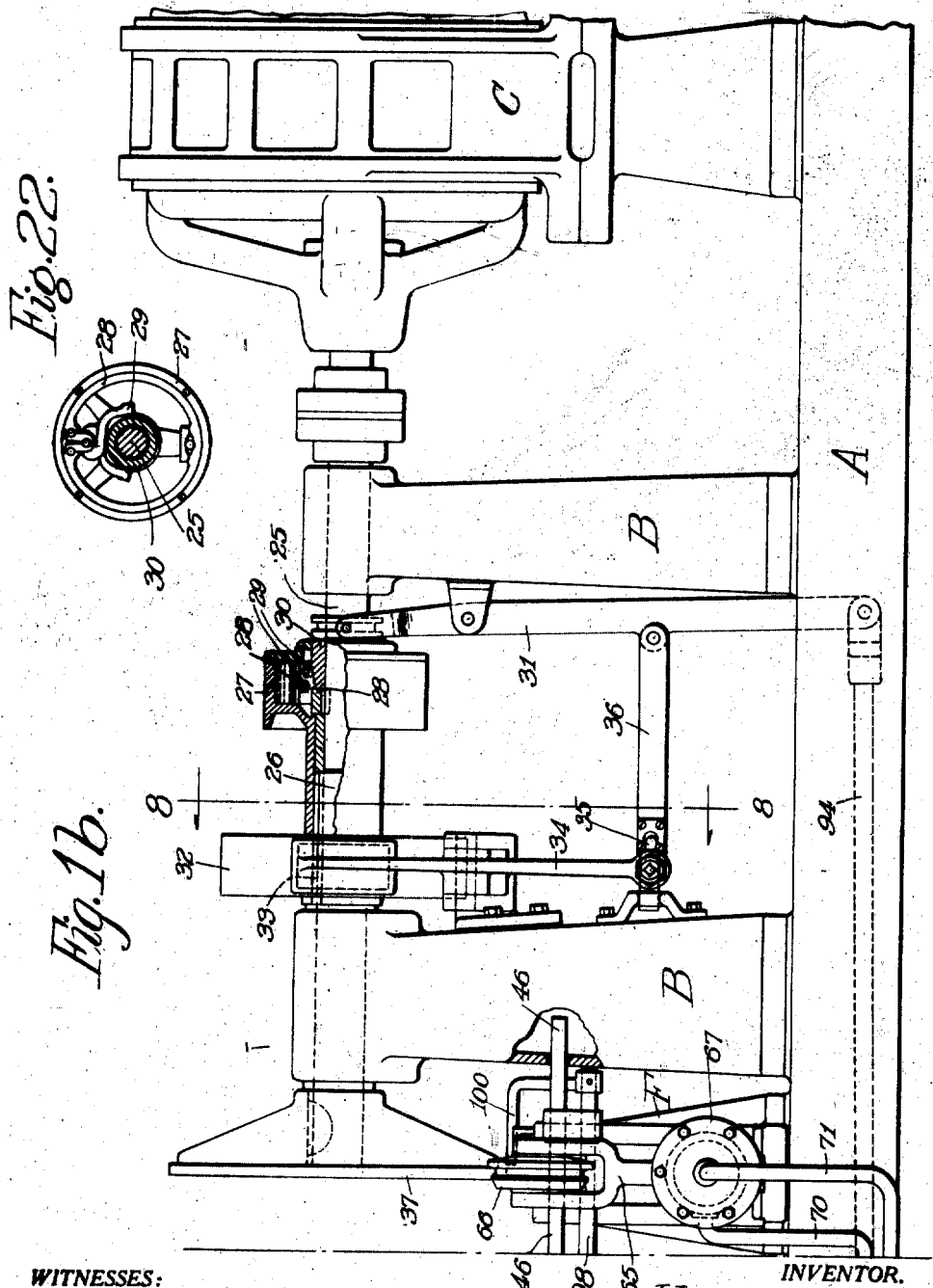

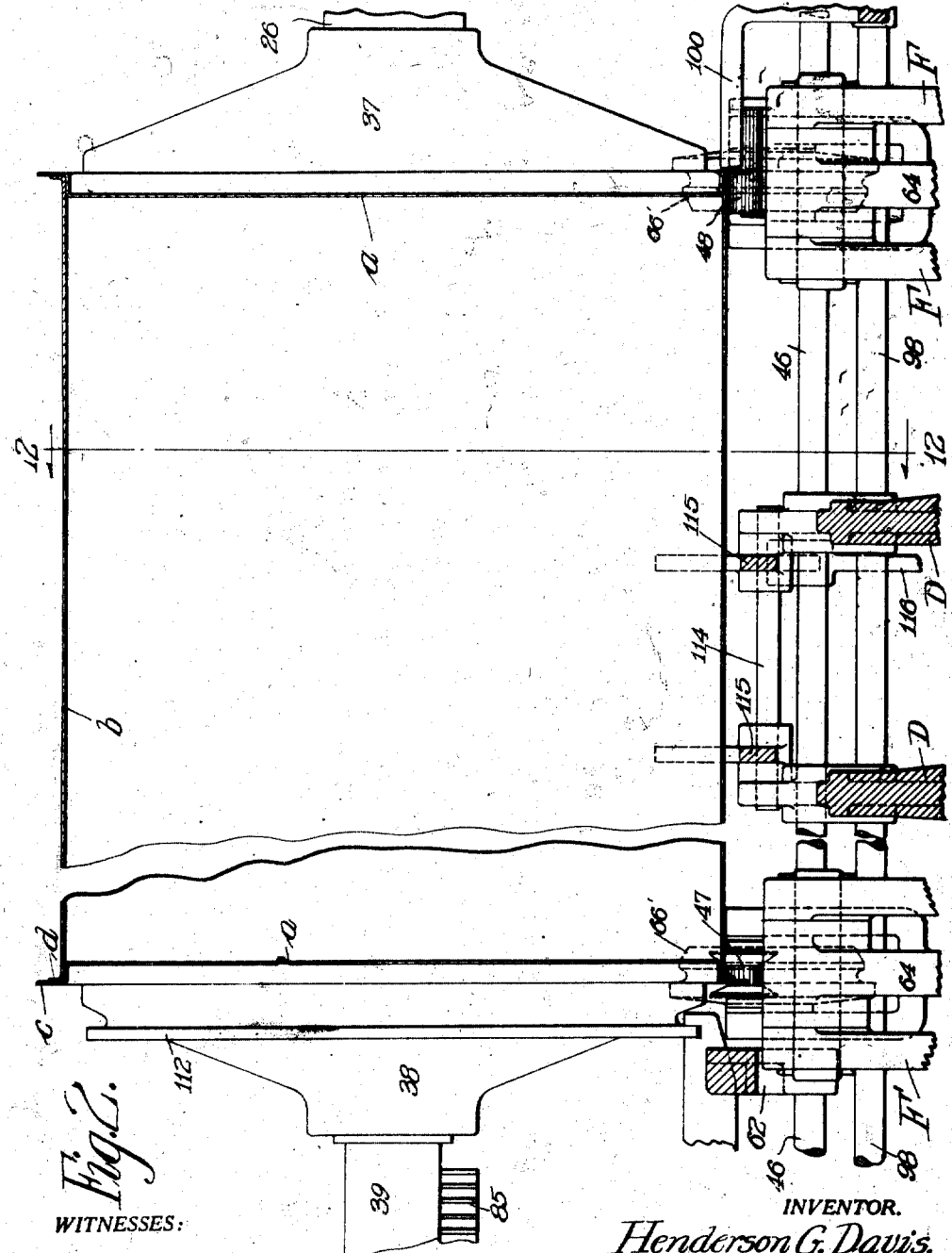

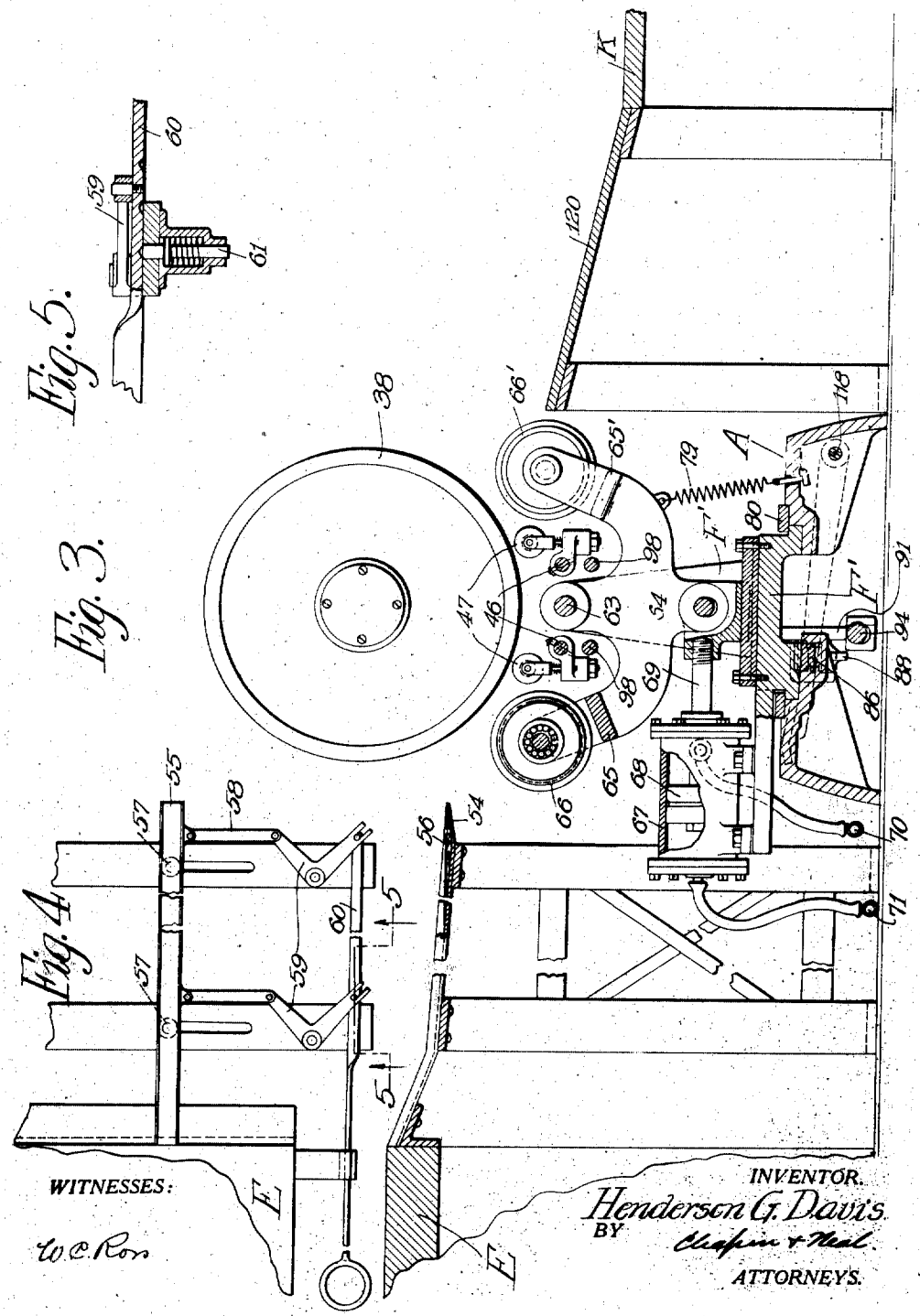

H. G. DAVIS.
METAL WORKING APPARATUS.
APPLICATION FILED APR. 30, 1917.
1,275,867.
Patented Aug. 13, 1918.
9 SHEETS—SHEET 5.
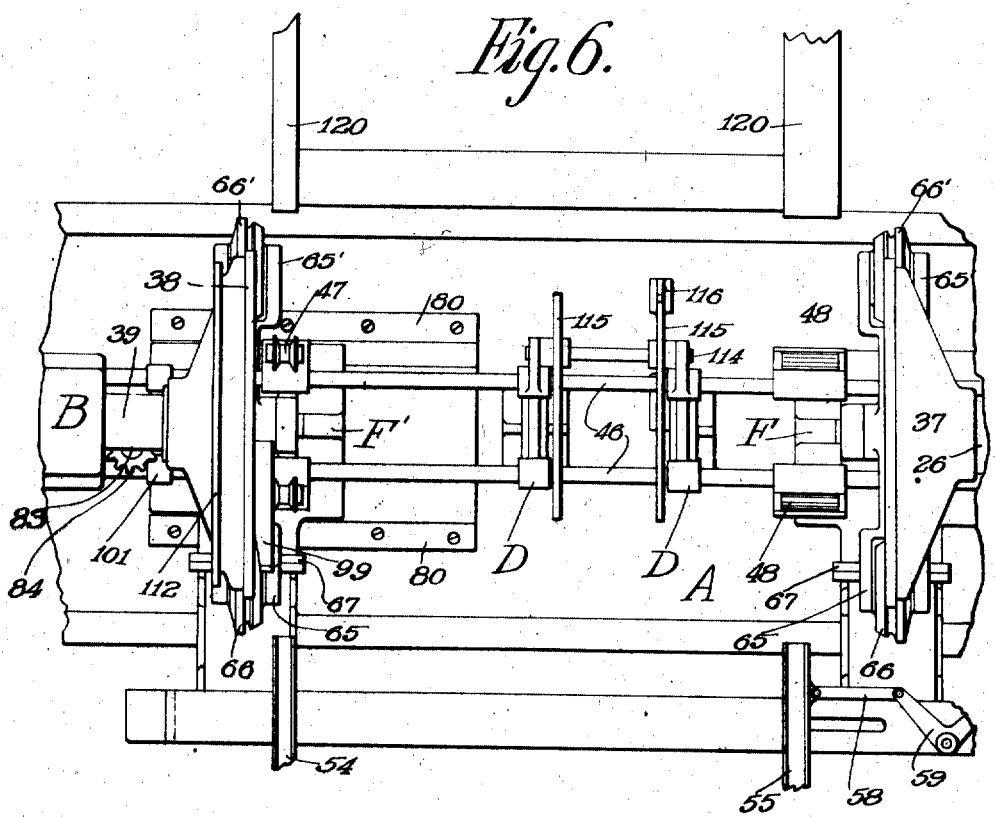
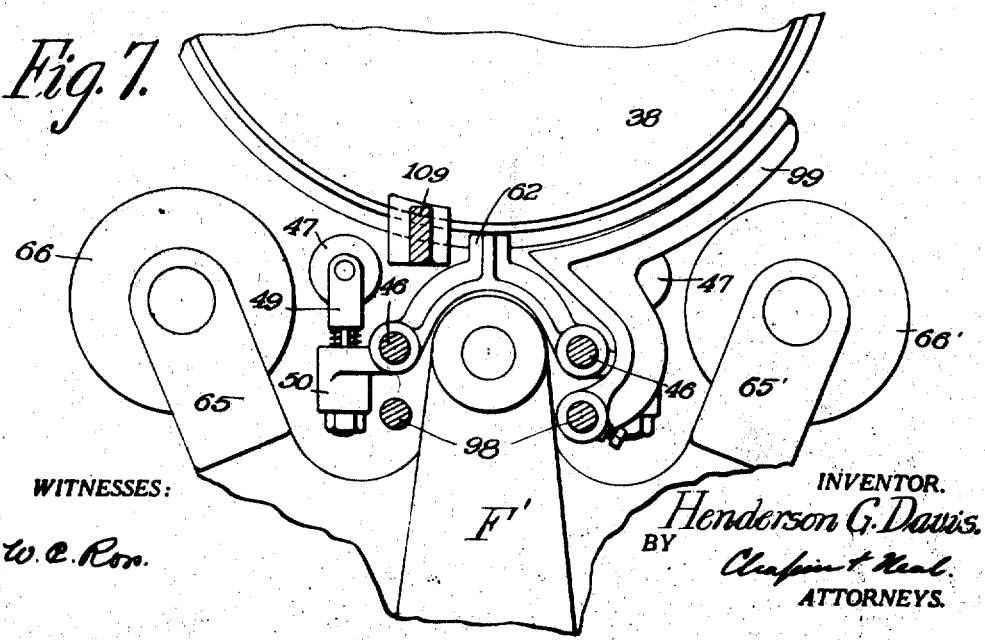
WITNESSES:
W. C. Roe.
INVENTOR.
Henderson G. Davis.
BY
Clapin + Neal
ATTORNEYS.

H. G. DAVIS.
METAL WORKING APPARATUS.
APPLICATION FILED APR. 30, 1917.
1,275,867.
Patented Aug. 13, 1918.
9 SHEETS—SHEET 6.
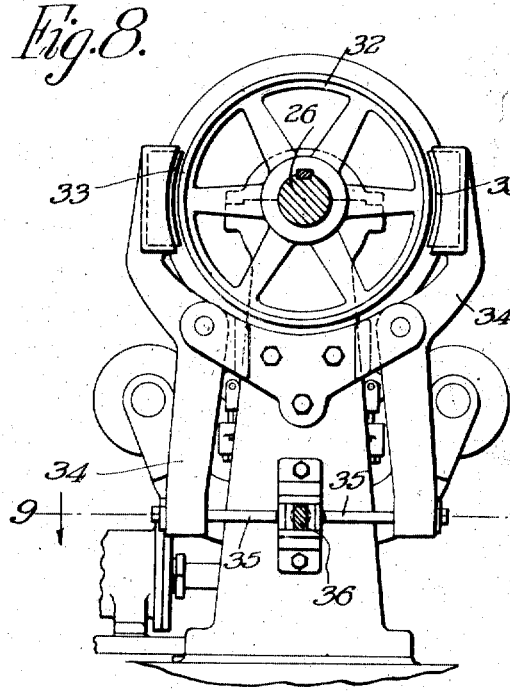
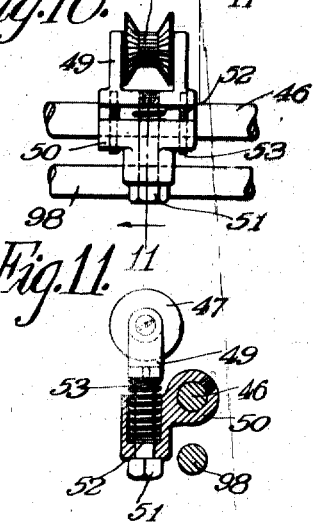
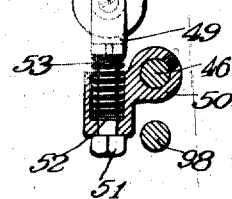
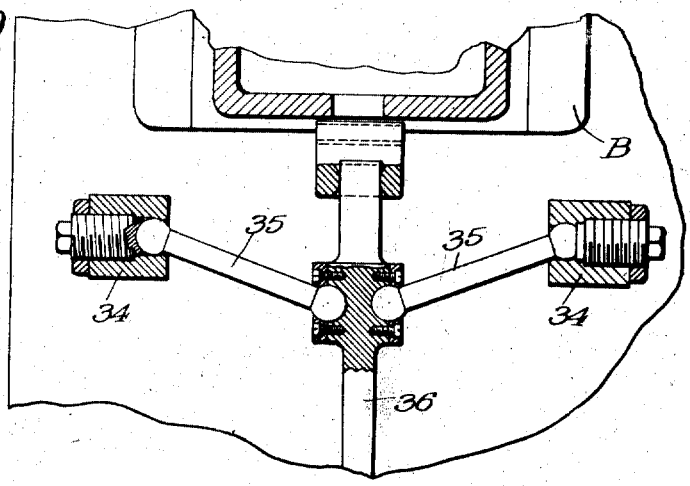
WITNESSES:
INVENTOR.
Henderson G. Davis.
BY
ATTORNEYS.

H. G. DAVIS.
METAL WORKING APPARATUS.
APPLICATION FILED APR. 30, 1917.

1,275,867.

Patented Aug. 13, 1918.
9 SHEETS—SHEET 7.

WITNESSES:
W. C. Ross.

INVENTOR.
Henderson G. Davis.
BY Chapin + Neal.
ATTORNEYS.

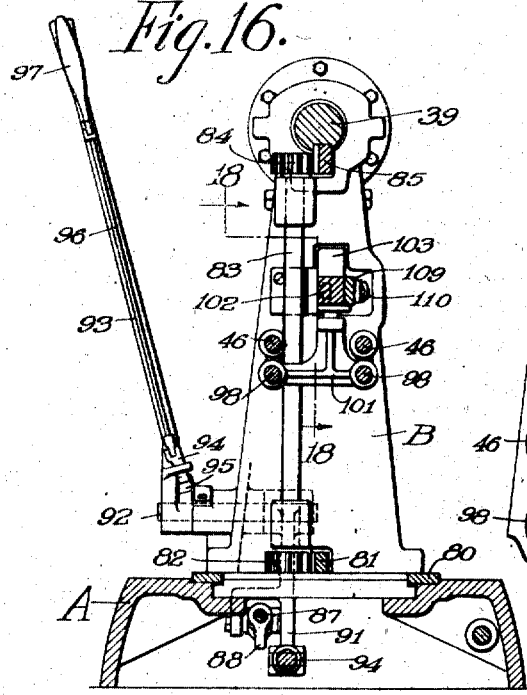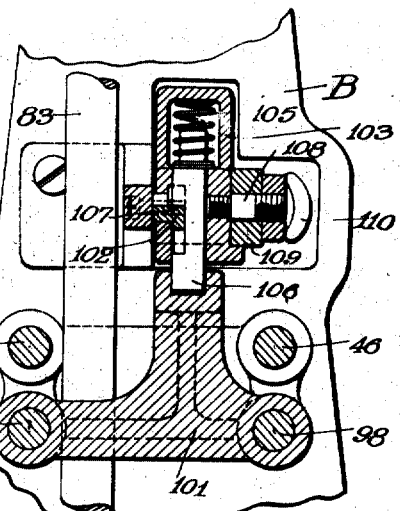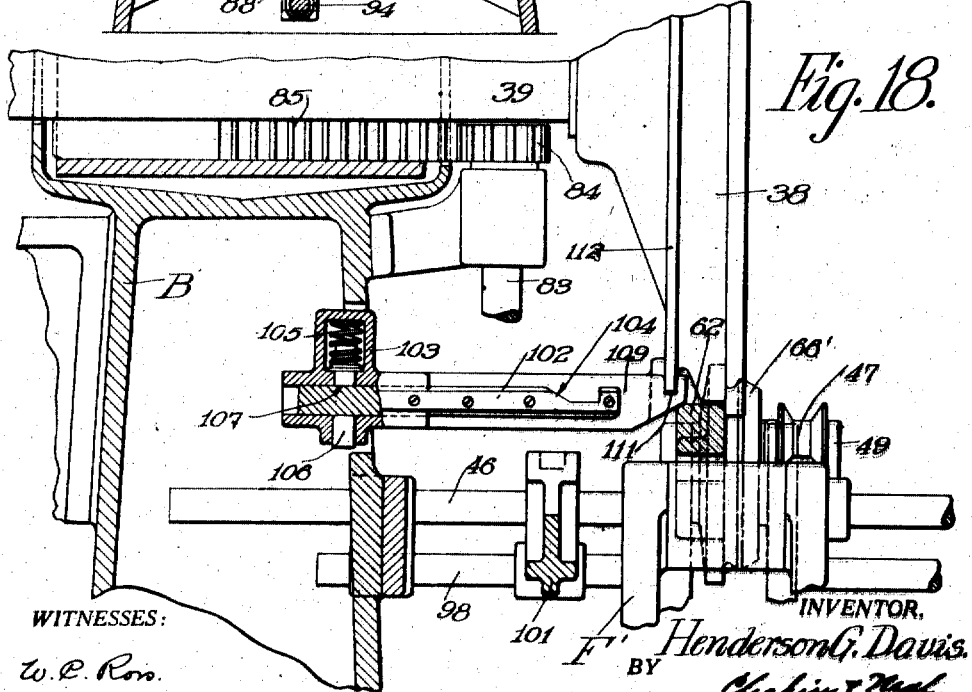

H. G. DAVIS.
METAL WORKING APPARATUS.
APPLICATION FILED APR. 30, 1917.
1,275,867.
Patented Aug. 13, 1918.
9 SHEETS—SHEET 9.
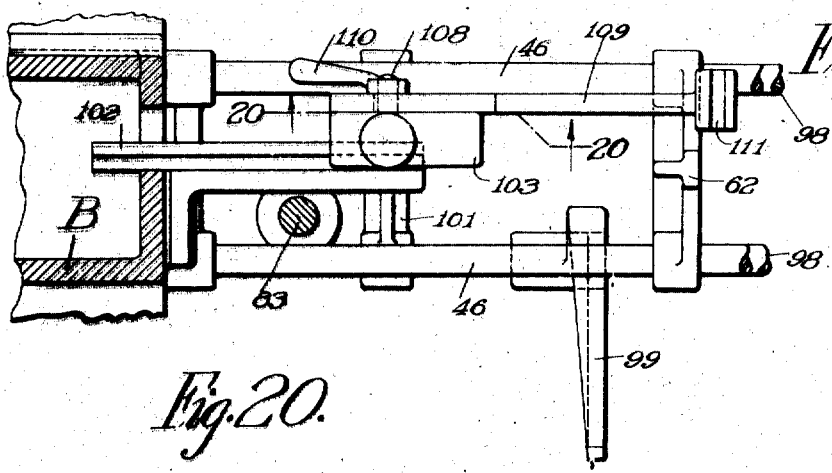
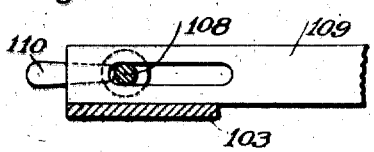
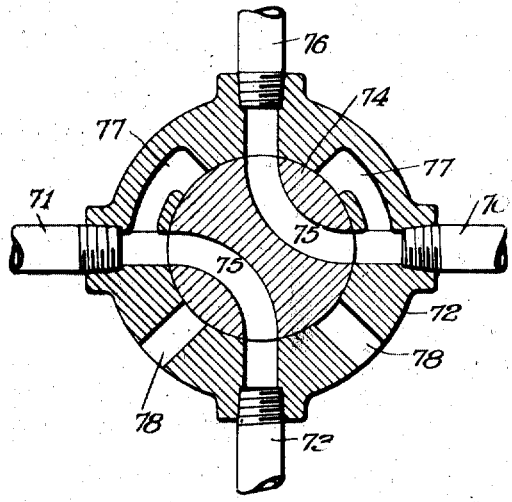
WITNESSES:
W. C. Ron.
INVENTOR.
Henderson G. Davis.
BY Chapin + Neal
ATTORNEYS.

UNITED STATES PATENT OFFICE.

HENDERSON G. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

METAL-WORKING APPARATUS.

1,275,867.  Specification of Letters Patent.  Patented Aug. 13, 1918.

Application filed April 30, 1917. Serial No. 165,399.

*To all whom it may concern:*

Be it known that I, HENDERSON G. DAVIS, a citizen of the United States of America, residing in Springfield, in the county of Hampden and State of Massachusetts, have invented certain new and useful Improvements in Metal-Working Apparatus, of which the following is a specification.

This invention relates to a barrel machine or metal working apparatus. Its particular purpose is to complete the formation of cans or barrels the sections of which have been first partially formed and then assembled together for the operation of the present apparatus. The invention is particularly designed to form barrels and like heavy containers and has to do with improved means for joining the heads of barrels to the cylindrical body portions, in improved means for manipulating the work itself while in the machine and improved means generally for holding and operating the barrel and applying tools thereto in the desired operations.

The art of joining the heads to cylindrical body portions to form cans or barrels is quite well known, and the present invention has for one object to provide improved means particularly adapted to handle rather heavy articles and work such articles to desired form in a quick, convenient, and efficient manner.

The objects of the invention will be brought out more fully in the detailed description of the combinations and sub-combinations of elements designed for coöperative functions in the formation of the barrel and then such objects will appear clearly in the appended claims which point out and define the invention.

The invention, in an embodiment at present preferred, is shown for illustrative purposes in the accompanying drawings, in which—

Figure 1ª is a side elevational view with parts broken away of the left hand portion of the machine;

Fig. 1ᵇ is a similar view of the right hand portion of the machine; this figure should be imagined as joined end to end with Fig. 1ª to give a complete side elevational view of the machine;

Fig. 2 is a sectional elevation of the central portion of the machine showing a barrel supported therein;

Fig. 3 is a cross sectional view taken on the line 3—3 of Fig. 1ª, showing the runways for supplying barrels to the machine and removing them therefrom;

Fig. 4 is a fragmentary plan view of a part of the supply runway;

Fig. 5 is a sectional elevation taken on the line 5—5 of Fig. 4;

Fig. 6 is a plan view of the central portion of the machine;

Fig. 7 is an enlarged fragmentary cross sectional view taken on the line 7—7 of Fig. 1ª;

Fig. 8 is a cross sectional view taken on the line 8—8 of Fig. 1ᵇ showing the braking mechanism;

Fig. 9 is a sectional plan view taken on the line 9—9 of Fig. 8;

Fig. 10 is a detail elevational view of one of the barrel supporting rolls;

Fig. 11 is a cross sectional view thereof taken on the line 11—11 of Fig. 10;

Figure 1A:
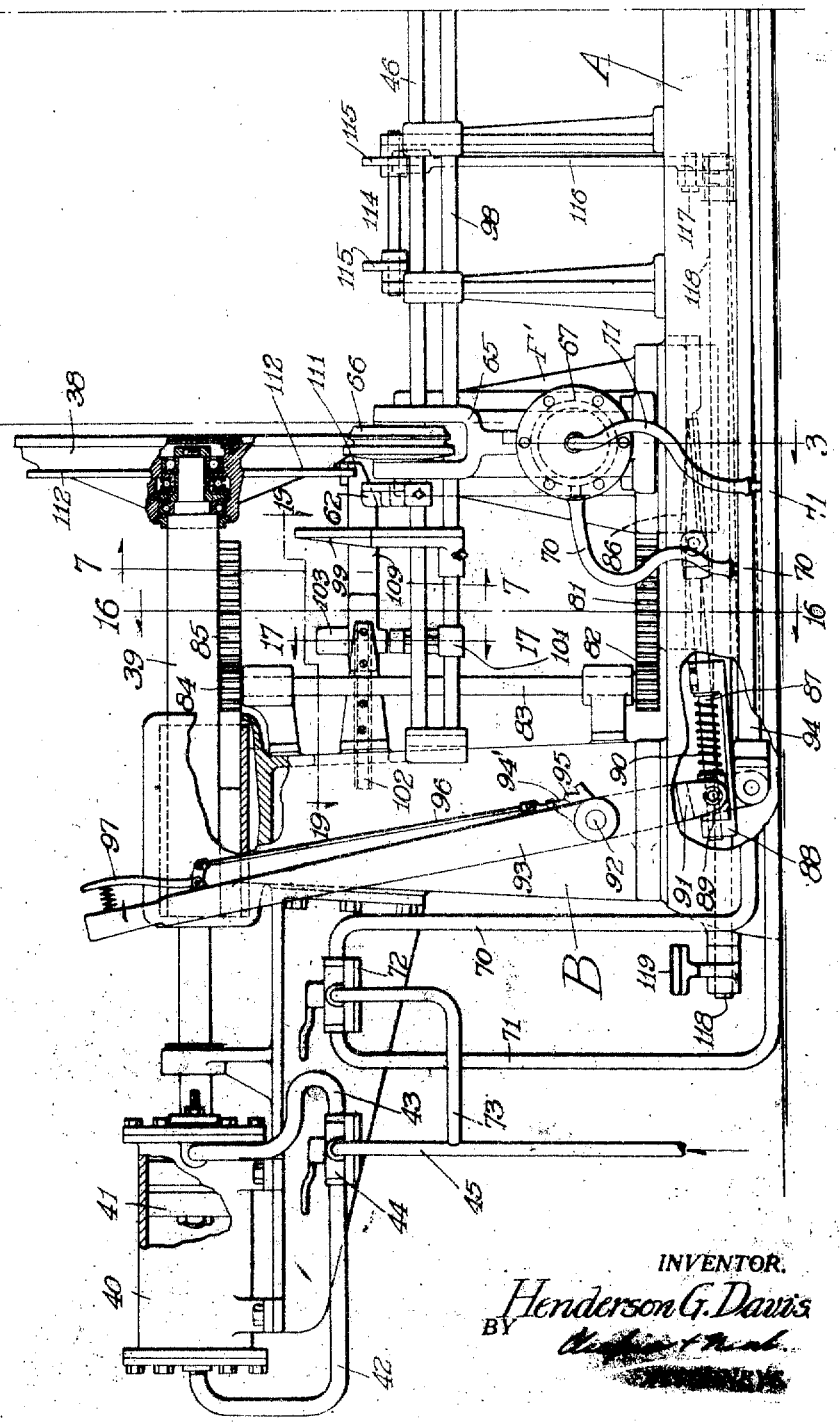
Figure 13:
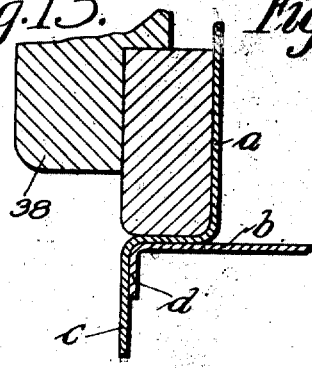
Figure 14:
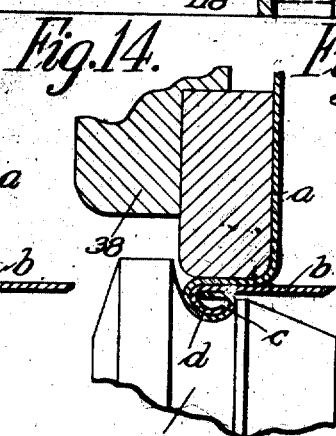
Figure 15:
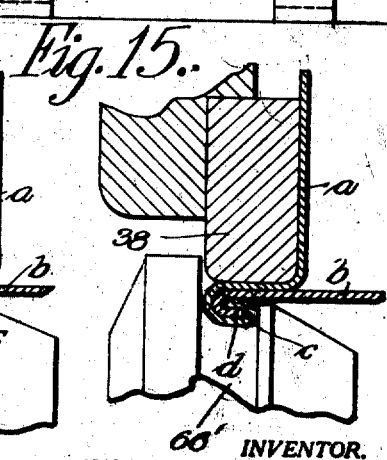

Figs. 13, 14, and 15 are enlarged fragmentary sectional views illustrating the steps in joining the heads to the barrel shell;

Fig. 16 is a cross sectional view taken on the line 16—16 of Fig. 1ª;

Fig. 17 is an enlarged cross sectional view taken on the line 17—17 of Fig. 1ª;

Fig. 18 is an enlarged sectional elevation taken on the line 18—18 of Fig. 16 with the parts shown in retracted position;

Fig. 19 is an enlarged sectional plan view taken on the line 19—19 of Fig. 1ª;

Fig. 20 is a detail sectional elevation taken on the line 20—20 of Fig. 19;

Fig. 21 is a sectional plan view of the valve for controlling the pressure rolls of the machine; and Fig. 22 is a cross sectional view of the clutch.

The machine, in general, comprises a pair of alined rotatable chucks arranged for relative axial movement and adapted to grip and rotate the barrel; supporting devices upon which a partially formed barrel may be automatically delivered from a supply trackway, when the chucks are separated, and supported in alinement with the latter;

means to force the chucks together to clamp said barrel therebetween; sets of rolls adjacent each chuck, the rolls of each set being arranged to act successively on the heads of the barrel as it is rotated to simultaneously join the heads to the shell of the barrel by a crimping operation; mechanism operable by separation of the chucks to strip the barrel therefrom; and ejecting mechanism to throw the completed barrel out of the machine and upon a delivery runway.

The means for supporting and rotating the barrel will first be described with particular reference to Figs. 1ᵃ and 1ᵇ. A represents the bed plate of the machine and mounted thereon at suitably spaced intervals are three pedestals B. Mounted in the right hand pedestal B is a driving shaft 25 which may be driven by any suitable means, such as a motor C (Fig. 1ᵇ) suitably supported from bed A. Rotatably mounted in the intermediate pedestal B is a shaft 26 which is alined with shaft 25 and adapted to be operably connected to and disconnected from the latter by a suitable clutch device. The latter, as shown in Fig. 1ᵇ, comprises a part 27 secured to shaft 26 and having a cup shaped end. Disposed within the latter and keyed to shaft 25 is a split ring 28, the ends of which may be spread apart by pivoted levers 29 which in turn are arranged to be separated by a cam element 30 slidably mounted for axial movement on shaft 25. Element 30 is movable in an obvious manner by a lever 31, pivoted intermedite its ends of the right hand pedestal B, whereby shafts 25 and 26 may be operably connected and disconnected as desired. A section through the clutch is shown in Fig. 22 to indicate its general construction, but a clutch of other construction may be used if more convenient. The lever 31 is actuated by means to be later described.

Fixed to shaft 26 adjacent part 27 is a brake drum 32 (Figs. 1ᵇ and 8) and on opposite sides thereof are brake shoes 33. The latter are mounted in the upper ends of levers 34 pivoted intermediate their ends to a bracket secured to the intermediate pedestal B. The lower end of levers 34 are connected by links 35 (Fig. 9) to a horizontally disposed rod 36, the links having a ball and socket connection with the lever and rod as clearly shown in Fig. 9. Rod 36 is pivotally connected at one end to the described lever 31 (Fig. 1ᵇ) and its other end is loosely supported for sliding movement in a suitable bracket attached to the intermediate pedestal B, as clearly shown in Figs. 1ᵇ and 9. When lever 31 lies in the position shown, shafts 25 and 26 are connected in an operable driving engagement, and the lower ends of levers 34 are drawn together into the position shown in Figs. 8 and 9 so that the drum 32 is free from shoes 33. When, however, the element 30 is moved to disconnect shafts 25 and 26, the levers 34 are spread apart by rod 36 and links 35 with a toggle action, as will be obvious from Fig. 9, to force shoes 33 against drum 32. Thus, shaft 26 may be quickly brought to rest when disconnected from shaft 25.

Fixed to the left hand end of shaft 26 is a chuck 37 (Fig. 1ᵇ) which is adapted to be forced in a manner to be described into the cupped end of a barrel head *a*, as indicated in Fig. 2. The chuck 37 has a part of its periphery so formed as to snugly fit the head *a*, so that the latter may be rotated thereby, and preferably this part is slightly tapered to facilitate the entrance and removal of the head. In axial alinement with chuck 37 and spaced therefrom is a chuck 38, of generally similar construction, which is adapted to engage a second similarly formed barrel head *a*. Chuck 38 is rotatably mounted, preferably by ball bearings as indicated in Fig. 1ᵃ, on the end of a shaft 39. The latter is slidable in the left hand pedestal B but is held from rotation therein by means to be later described. Mounted on a bracket secured to the left hand pedestal B and in alinement with shaft 39, is a cylinder 40 (Fig. 1ᵃ) and movable therein is a piston 41 secured to the end of the shaft. Opposite ends of cylinder 40 are connected by pipes 42 and 43 to a two way valve 44 to which fluid under pressure is supplied by a pipe 45 from a suitable source. Valve 44 may be of any of the well known types and has not been illustrated in detail since its specific structure is unnecessary to an understanding of the invention. For the present purposes, it will suffice to state that fluid under pressure may be admitted to the cylinder 40 on either side of piston 41 and simultaneously exhausted from the opposite side thereof through suitable connections with the valve 44, whereby the shaft 39 and chuck 38 may be moved axially toward or away from chuck 37. The chuck 38 when retracted as shown in Figs. 6 and 19 permits a barrel to be fed into the machine.

The means for temporarily supporting a barrel in alinement with chucks 37 and 38 while the latter is retracted will next be described. Referring to Figs. 1ᵃ, 3, and 6, extending between the left hand and the intermediate pedestal and slidably mounted therein are a pair of rods 46 which are arranged in the same horizontal plane, one on each side of the axis of chucks 37 and 38, as shown in Fig. 6. These rods are further supported in a pair of spaced brackets D mounted on the bed plate A intermediate chucks 37 and 38. Supported from each rod 46 adjacent chuck 38 is a flanged roll 47 and adjacent chuck 37 is a relatively long unflanged roll 48. The detail of the mounting of the rolls 47 and 48 is the same and is best shown in Figs. 10 and 11 in connection with a roll 47. The latter is rotatably mounted in a forked bracket 49 which is vertically slidable relatively to a bracket 50 fixed to rod 46. A bolt 51 passes loosely through bracket 50 and is threaded into the lower end of bracket 49, whereby the separation of the two brackets may be limited by the engagement of the head of bolt 51 with the lower end of bracket 50. Coiled around bolt 51 is a spring 52 which tends to force bracket 49 upwardly to the limit allowed by bolt 51. On each side of the latter pins 53 fixed in bracket 49 pass downwardly and loosely through bracket 50 to prevent relative turning of the two brackets.

The rolls 47 are alined with a track 54, when the chuck 38 is retracted as shown in Fig. 6. Track 54 has upstanding side flanges as shown in Figs. 3 and 6 and may advantageously consist of a channel iron as shown. Spaced from track 54 and in parallel relation therewith is a similarly formed track 55 and both tracks are suitably supported from the floor as shown in Fig. 3. Tracks 54 and 55 extend from a platform E in downwardly inclined relation therewith to a position above, and at a horizontal distance away from the rolls 47 and 48. The ends of each track adjacent the rolls are bent upwardly, as shown in Fig. 3, to form a trough to receive paint or the like as indicated at 56. The barrel comprises two heads $a$ and a cylindrical shell $b$ (Fig. 2) and these parts, previously assembled, are placed on platform E and rolled onto the trackways 54 and 55. As they roll downwardly thereon, the flanges $c$ of the heads $a$ are coated with paint 56. As the barrels roll down the trackways, they acquire sufficient momentum to jump the space between the ends of the trackways and the rolls 47 and 48 and lodge between the latter. The springs 52 absorb the shock received by an incoming barrel in an obvious manner. The assembled barrel partially formed may be placed on rolls 47 and 48 by hand or other means as desired. The trackways 54 are illustrative only of one convenient means for the purpose.

In order that barrels of various lengths may be accommodated the rolls 48 are made relatively long as described and track 55 is made adjustable. Referring to Fig. 4, track 55 is held to its supporting frame by pins 57 which move in suitable slots in the frame, and the track is connected by two or more links 58 to bell cranks 59 pivoted on the frame. The bell cranks may be moved manually when desired by a slide rod 60, and in the under face of the latter are a plurality of recesses (Fig. 5) any one of which may be engaged by a spring pressed pin 61. The latter serves to frictionally hold the track 55 in any of a plurality of predetermined positions so that the distance between the tracks may be varied to correspond with barrels of various lengths. The roll 48 is sufficiently long to receive the head $a$ of a barrel, in any of the various positions of track 55.

The rolls 47 and 48 are movable axially by means of a bracket 62 (Figs. 7 and 18) which connects both rods 46 and is adjustably fixed thereto. Bracket 62 has a central upwardly extending portion which lies in the rearward path of chuck 38 and is adapted to be moved thereby. Referring to Fig. 2 as the chuck 38 is retracted, it eventually engages bracket 62 and on continued movement carries the latter to the position shown in Fig. 18, whereby rolls 47 and 48 are alined, as shown in Fig. 6, with their respective trackways.

After the barrel has been placed upon the rolls as described, the chuck 38 is moved to the right by fluid pressure on piston 41. On continued movement chuck 38 engages the left hand head $a$ and thereafter the rolls 47 are moved by the engagement of flange $c$ of the head with the flanges of the rolls 47. Thus, rods 46 which are slidably mounted as before stated, and rolls 48 are shifted axially out of alinement with the trackway. Continued movement of the chuck 38 forces the heads $a$ upon the chucks while still supported by the rolls 47 and 48. The parts are then positioned as in Fig. 2. It is to be noted that the rolls are always moved into the same position by the retraction of chuck 38 but, when moved in the other direction, they may occupy various positions corresponding to the length of the barrel used.

The means for joining the heads $a$ to shell $b$ will next be described. Referring to Figs. 1$^a$ and 1$^b$, mounted on bed plate A is a bracket F and also a slidable bracket or carriage F', which brackets are arranged centrally below the chucks 37 and 38, respectively. Pivoted to each bracket at 63 (Fig. 3) is a lever 64 having forked extensions 65 and 65' on each side of pivot 63. Supported in the extensions 65 and 65' (preferably by means of roller bearings) are rolls 66 and 66' which are arranged to effect the preliminary and final crimping operations respectively on the barrel heads. Supported on lateral extensions of brackets F and F' are cylinders 67 and movable therein are pistons 68 which are connected by rods 69 to the lower ends of levers 64. Opposite ends of the cylinder are connected by pipes 70 and 71 (Figs. 1$^a$, 1$^b$, and 3) to a valve 72 (Fig. 1$^a$) which is supplied with fluid under pressure by a pipe 73.

The interior of valve 72 is shown in diagrammatical form in Fig. 21 to which reference is now made. A rotatable element 74 has two cored passages 75 of elbow form which may be positioned as shown to connect pipe 71 to a supply pipe 73 and to connect pipe 70 to an exhaust pipe 76. When element 74 is thus positioned, fluid will be admitted simultaneously to both cylinders 67 to force pistons 68 to the right as viewed in Fig. 3, forcing roll 66' against the barrel. When element 74 is turned ninety degrees fluid will be admitted to pipe 70 and exhausted from pipe 71, thus retracting rolls 66' and forcing rolls 66 against the barrel. After both the rolls 66 and 66' have operated upon the barrel, the lever 64 must be restored to "neutral" position, as in Fig. 3, to permit removal of the barrel. This is accomplished by moving element 74 so that each passage 75 connects a port 77 to an auxiliary exhaust port 78. The ports 77 are connected to pipes 70 and 71 but are normally closed off by the element 74, as shown in Fig. 21. It will be seen that when element 74 is moved to its "neutral" position as described, cylinders 67 are exhausted on both sides of pistons 68. The roll 66' is the last to bear upon the barrel, so that when the crimping operation is completed roll 66' remains elevated. However, when element 74 is moved to neutral position, the roll 66' may then be drawn down by a spring 79 (Fig. 3). This spring has just sufficient tension to move lever 64 into the position shown in Fig. 3 and has a loose slidable connection with bed plate A so that when roll 66 is elevated, the spring will not be compressed. It will thus be seen that after the rolls 66 and 66' have operated, they may be restored to the position shown in Fig. 3 by spring 79 after element 74 has been moved to neutral position as described. It is to be understood, of course, that the mechanism described in connection with Fig. 3 is duplicated by like mechanism on the bracket F' all operated from valve 72.

The rolls 66 and 66' function to roll the flanges c of heads a into interlocking relation with a similar but shorter flange d on the shell b. The arrangement of head a and flange c with relation to shell b and flange d prior to the operation of rolls 66 and 66' is clearly shown in Fig. 13. As the roll 66 is forced upwardly by the means described, a groove in the roll engages the flange c and bends it to the right (as viewed in Fig. 13) and eventually the flange d is bent by the action of flange c thereupon. Roll 66 brings the parts into the relative positions shown in Fig. 14. The final crimping operation is effected by roll 66', the groove of which is of slightly different contour as shown in Fig. 15, which figure also shows the completed joint between the heads a and shell b. It is to be noted that the paint applied to the flanges a as described is forced into all the interstices between flanges c and d to form a tight leakless joint therebetween. Further description of the crimped joint is thought unnecessary to an understanding of the invention as this type of joint is generally well understood in the art. The machine, however, is designed to hold such rolls and do such crimping work as the rolls may be designed for and a special form of crimped joint which may be made to advantage in this machine is disclosed in my copending application Serial No. 165,400 filed April 30, 1917.

The rolls 66 and 66' must always come into a definite predetermined position with respect to the chucks. The right hand set of rolls and chuck 37 are always so positioned since neither is capable of relative axial movement. The chuck 38, however, moves to various positions depending on the length of barrel employed and, therefore, means must be provided (if different sized barrels are to be formed) to cause the rolls 66 and 66' in carriage F' to aline with chuck 38 whatever the position of the latter may be. This result is obtained by connecting the chuck shaft 39 to carriage F' so that the two move in unison. Referring to Fig. 3, the carriage F' is slidably mounted in suitable ways formed centrally in the bed plate A and is held thereto by suitable gibs 80. Referring to Figs. 1ª and 1ᵇ, fixed to carriage F' near the base thereof and extending horizontally toward the left hand pedestal B is a rack 81. In mesh with the latter is a gear 82 fixed to the lower end of a vertically arranged shaft 83 mounted in brackets secured to the left hand pedestal B. On the upper end of shaft 83 is a pinion 84 which meshes with a rack 85 fixed on the lower part of shaft 39 as clearly shown in Figs. 1ª and 1ᵇ. It will thus be seen that, as chuck 38 is moved back and forth, the carriage F' is moved therewith, the gears 82 and 84 being of equal diameter.

Chuck 38, as has been explained may on its forward stroke assume various positions and thus carriage F' will also come to rest in various positions, according to the length of the barrel being joined.

It is desirable to hold the carriage F' firmly to the bed plate A in any of its working positions. The means for accomplishing this function are clearly shown in Figs. 1ª and 3 and will now be described. The bed plate A is recessed below one side edge of the base of carriage F' to receive a wedge 86 which, when positioned as in Fig. 1ª, forces the member F' upwardly against gibs 80 and prevents movement of the member F' in any direction. By moving the wedge 86 to the left from the position as viewed in Fig. 1ª, it is lowered below the bottom of the carriage to permit free sliding movements of the latter. Wedge 86 is pivotally connected to a rod 87 which is fixed in and extends between spaced ears of a yoke 88. An element 89 is slidable on rod 87 between the spaced ears and may be moved to the right (Fig. 1ᵃ) against the tension of a coiled spring 90. Element 89 is pivoted to an arm 91 which is fixed to a short horizontal shaft 92 mounted in left hand pedestal B (Fig. 1ᵃ). Arranged without the pedestal and fixed to the outer end of shaft 92 is a lever 93 which is adapted for manual operation to operate the wedge 86. Arm 91 is connected by a rod 94 to the lower end of the described lever 31, so that as the arm 91 is moved to the right from the position shown in Fig. 1ᵃ, the wedge 86 is retracted to free carriage F′, and lever 31 is actuated to cause the disconnection of shafts 25 and 26 and to apply the shoes 33 to the brake drum 32. Lever 93 is provided with a slidable dog 94′ which may engage in either of the stops 95 formed on the support for shaft 92, the lever being forced toward the right by the spring 90 in an obvious manner. Dog 94′ is connected by a link 96 to a spring pressed bell crank lever 97 pivoted to lever 93. Lever 97 when pressed toward the latter withdraws dog 94′ from stops 95 in an obvious manner to permit movement of the lever 93. It is to be noted that, although the latter is always moved a constant amount to actuate the brake and clutch, the wedge 86 being movable only through spring 90 may move variable distances as necessitated by the position of carriage F′ and is yieldingly forced into position to clamp the carriage. The withdrawal of the wedge, however, is effected positively by the abutment of members 89 and 88.

The means for stripping the barrel from the chucks 37 and 38 will next be described. Referring to Figs. 1ᵃ, 1ᵇ, and 7, vertically below each of the described rods 46 and mounted for sliding movement in a similar manner is a rod 98. Fixed to one of the rods 98 is an arm 99, which as best shown in Fig. 7 extends upwardly toward chuck 38 and has a curved upper portion concentric with the chuck. The shape of arm 99 is such that it may move relatively to chuck 38, the member 62, or rolls 66 and 66′ without interference. Referring to Figs. 1ᵇ and 2, fixed to rods 98 adjacent chuck 37 is an arm 100, which is bent in the form shown so that a portion thereof lies just to the rear of the head a and just below the lower peripheral portion of chuck 37. Referring to Fig. 1ᵃ, the rods 98 are connected together adjacent the left  d pedestal B, by a member 101. The latter is adapted to be moved to the left from the position shown in Fig. 1ᵃ by the retraction of chuck 38 to actuate the parts 99 and 100. The member 100, as will best be seen from Fig. 2, will engage the head a of the barrel and force it from the stationary chuck 37. The member 100, as will be apparent from Fig. 1ᵇ, can move to the left only a limited distance as it finally abuts a bracket on pedestal F. On continued movement of chuck 38 to the left, the barrel will be carried therewith, the right end thereof being supported on rolls 48. Eventually chuck 38 will pass the arm 99 and the latter, being prevented from movement to the left, as described, will remove the head a from chuck 38. The parts then are positioned as shown in Fig. 6. The completed barrel is then supported on rolls 47 and 48, although the barrel has been purposely omitted from Fig. 6 to reveal parts therebelow.

The means for moving the member 101 will next be described. Referring to Figs. 1ᵃ, 18, and 19, a guide bar 102 is secured in horizontal position to a suitable bracket secured to the left hand pedestal B and extends forwardly therefrom. Bar 102 is of the cross sectional shape shown in Fig. 16 and slidably mounted on the bar is a member 103 (Figs. 17, 18, and 19). Bar 102 has a recess formed therein as shown in Fig. 18 and one wall of the recess forms a cam surface 104. Slidable vertically in member 103 against the tension of a spring 105 is a pin 106, the lower part of which is of square cross section and adapted to engage in a square socket formed in the described member 101. Pin 106 is cut away as shown in Fig. 17 to receive bar 102 and a shoulder 107 on the pin normally rests in the described recess in bar 102 in that it is positioned as shown in Fig. 17 to engage the member 101. The member 103 is movable to the left (Fig. 1ᵃ) by the retraction of chuck 38, and, as it is thus moved, shoulder 107 of pin 106 rides up on cam 104 and eventually withdraws the pin from member 101. Thereafter the member 103 moves idly on slide bar 102 without moving the member 101 or the rods 98 and 46. The latter are given just sufficient movement to abut arm 100 with the bracket on pedestal F as described.

Threaded into the rear side of member 103 is a stud 108 which passes through a suitable slot in a bar 109 as best shown in Figs. 17 and 20. Bar 109 may be clamped to member 103 in various positions of adjustment by a handle nut 110. The bar 109 extends horizontally forward toward chuck 38 and in its forward end has a transverse slot 111 (Fig. 19) which as shown in Figs. 1ᵃ and 18 is engaged by a circular rim 112 on chuck 38. Thus, the member 103 is moved back and forth in unison with chuck 38, and, as it is moved to the left, causes a movement of rods 98 until the pin 106 is lifted. It then moves farther to the left into the position shown in Fig. 18 and, as chuck 38 is subsequently moved to the right, pin 106 will eventually ride down on cam 104 and connect with member 101. Further movement of chuck 38 to the right will cause the rods 98 to be moved to bring the arms 99 and 100 into their original positions shown in Figs. 1ª and 1ᵇ, respectively. It will be obvious that for barrels of various length, chuck 38 will travel various distances, while arms 99 and 100 should move only the definite distance described. When a barrel of greater length is used the chuck 38 will not move to the right as far as illustrated and the distance between the chuck and member 103 must be shorter. The shortening of this distance is accomplished by loosening nut 110 and moving the member 103 forwardly with respect to bar 109, the pin 108 moving in the slot in the latter shown in Fig. 20. Thus, the arms 99 and 100 may be moved a definite predetermined distance irrespective of the length of barrel employed by the adjustment illustrated in Figs. 19 and 20.

Figure 12:
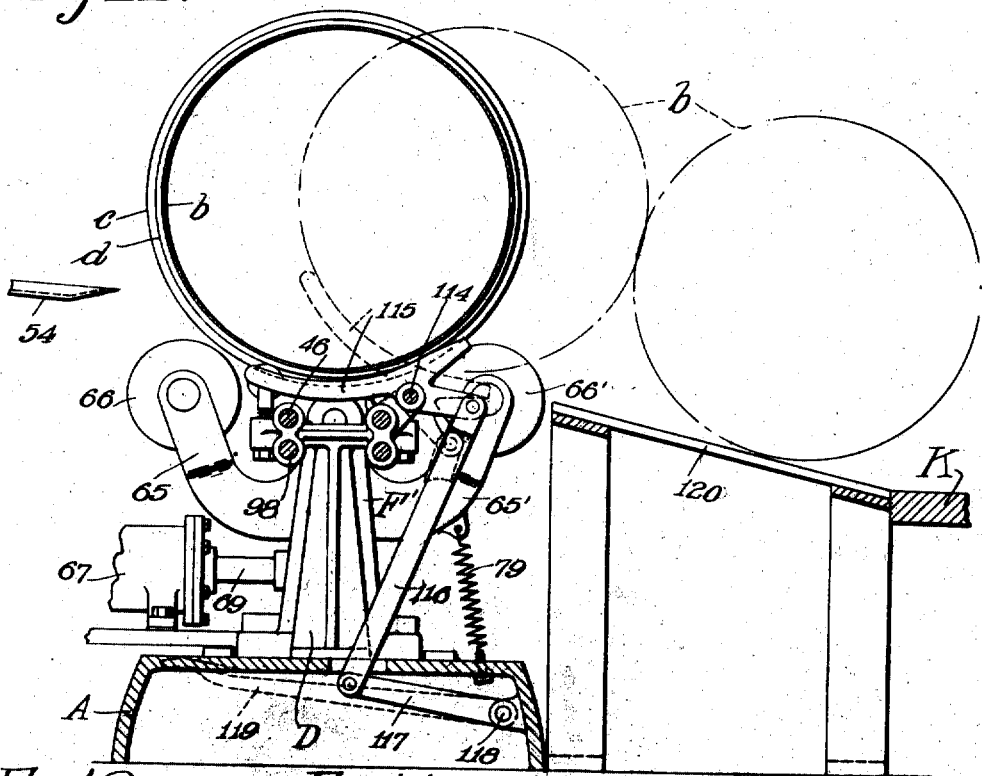
Fig. 12 is a cross sectional view taken on the line 12—12 of Fig. 2.

The means for ejecting the completed barrel from the machine will next be described. The barrel, after chuck 38 has been retracted, is left upon the supporting rolls 47 and 48. Referring to Figs. 6 and 12, a short shaft 114 is rotatably mounted in suitable ears formed on the rear of the described brackets D. Fixed to shaft 114 in spaced relation are two levers 115 which are normally held by their weight in the position shown by full lines in Fig. 12. The levers 115 are curved to lie closely adjacent and substantially concentric to shell $b$ and one thereof (Fig. 12) is connected by a link 116 to an arm 117 fixed on the end of a shaft 118. The latter is mounted in suitable lugs formed on the interior of bed A and extends along the rear walls of the bed to the left hand end thereof. A suitable foot treadle 119 is fixed on shaft 118 (Figs 1ª and 12) whereby the latter may be turned to swing both levers 115 into the position shown by dotted lines in Fig. 12. The levers 115 raise shell $b$ from rolls 47 and 48 and throw it upon a discharge runway which comprises two spaced parallel tracks 120. The latter are inclined downwardly toward and deliver the completed barrels upon a suitable platform K (Fig. 12).

The operation of the machine will next be described. Assuming that the chuck 38 is retracted, a flanged barrel shell $b$, with the flanged heads $a$ inserted therein, is rolled from platform E onto tracks 54 and 55. As the barrel rolls downwardly toward the machine, the flanges of shell $b$ pick up paint from the trough in the trackways and acquire sufficient momentum to jump the space between the ends of the tracks 54 and 55 and the rolls 47 and 48 or they may be carried over this space by hand. The barrels thus are deposited on the rolls which are yieldable to absorb the shock imparted by the incoming barrel. The rolls 47 and 48 support the barrel in alinement with chucks 37 and 38. Valve 44 is then actuated to admit fluid under pressure into the left hand end of cylinder 40 and chuck 38 is thereby forced to the right. As chuck 38 moves to the right, it engages one head $a$ of the barrel, and, since the flange $c$ of the head lies between the flanges of rolls 47, the latter, rods 46, and rolls 48 are moved therewith. Thus, the barrel may be shifted longitudinally of the machine while still effectively supported by the rolls in proper position for its engagement with the chucks. Eventually, the chucks 37 and 38 are forced into the heads $a$ and are thereafter held thereto by the pressure which is maintained on piston 41. The carriage F', meanwhile has been moving in unison with chuck 38 and becomes positioned as shown in Fig. 1ª.

The barrel is next to be rotated. Lever 93 is pulled toward the left into the position shown in Fig. 1ª, and the lever effects simultaneously a release of brake drum 32 from its shoes and a connection of shafts 25 and 26, whereby chucks 37 and 38 with the barrel therebetween are rotated. The wedge 86 is also yieldingly forced to the right by lever 93 to clamp the carriage F' to the bed plate. The valve 72 is then operated to admit fluid under pressure to the right hand side of pistons 68 (Fig. 3), whereby rolls 66 are simultaneously forced against the flanges $c$ and thereafter against the flanges $d$ to roll them into the interlocking relation shown in Fig. 14. Valve 72 is then moved to admit fluid under pressure to the left hand side of pistons 68 which cause the retraction of rolls 66 and the elevation of rolls 66' into engagement with the bent and interlocked flanges $c$ and $d$. Rolls 66' complete the crimping of the heads $a$ to shell $b$ and roll the parts into the position shown in Fig. 15. The completed barrel is then ready for removal.

Prior to removal of the barrel, valve 72 is turned to neutral position to equalize the pressure on both sides of pistons 68 whereby springs 79 may bring rolls 66 and 66' to the position shown in Fig. 3. Lever 93 is then moved to the right as viewed in Fig. 1ª, to retract wedge 86 and release carriage F'. Simultaneously, the clutch is moved to disconnect shafts 25 and 26 and brake shoes 33 are forced against drum 32 to quickly stop the rotation of the chucks and the barrel. Valve 44 is then moved to admit fluid under pressure to the right hand side of piston 41, whereby chuck 37 is moved to the left carrying carriage F' therewith into the position shown in Fig. 18.

As chuck 38 moves to the left bar 109 is moved therewith, and so also are the members 103 and 101 which are connected together by pin 106. The arm 100, thus is moved to the left as viewed in Figs. 1ᵇ and 2 and forces the head $a$ from chuck 37. Continued movement of bar 109 causes the disconnection of members 101 and 103 by the engagement of pin 106 with cam 104. Rods 98 are thus moved just sufficiently to strip the head a from chuck 37 by means of arm 100 and are held against further movement by the abutment of arm 100 with the bracket on pedestal F. Continued movement of bar 109 moves member 103 idly on the slide bar 102.

As the chuck 38 moves still farther to the left, the barrel is carried therewith as also are the rolls 47 and 48, until the head a on chuck 38 comes into engagement with the arm 109. The latter being stationary prevents further movement of the barrel, and the chuck 38 withdraws therefrom, leaving the barrel upon rolls 47 and 48. Further movement of chuck 38 will not move rolls 47 and 48 until it engages the bracket 62. Thus the rolls 47 become spaced from chuck 38 and are thereafter moved together in spaced relation until piston 41 reaches the end of its stroke. The parts then are positioned as shown in Figs. 6 and 18. The treadle 119 is then depressed to cause ejector levers 115 to discharge the barrel upon the delivery runways 120.

On a succeeding movement of chuck 38 to the right, the bracket 62 remains stationary until the chuck engages the head a of another barrel delivered upon rolls 47 and 48 as described, and thereafter rolls 47 and 48 and bracket 62 are moved as already described into the position shown in Figs. 1ª and 1ᵇ. Near the end of the movement of chuck 38 to the right pin 106 rides down the cam 104 and connects with member 101, whereby the arms 99 and 100 are restored to the positions shown in Figs. 1ª and 1ᵇ. The operations above described are then repeated.

It will thus be seen that the machine is capable of simultaneously joining both heads of a barrel to its shell in a rapid and automatic manner. Furthermore, barrels of various lengths may be handled by the machine, with only a relatively few adjustments, namely, the adjustment of track 55 and the adjustment of bar 109 relatively to the member 103. Provision has been made in the illustrated embodiment of the invention for barrels of three standard lengths. Obviously, the range of adjustment may be extended so that barrels of still other lengths may equally well be handled. An important feature of the structure described consists in the arrangement for positive clamping of the barrels to the chuck irrespective of slight variations in their length for the movement of chuck 38 to the right is limited only by the barrel itself after it has been positively clamped between the chucks. A further feature of importance is in the connecting means between chuck 38 and carriage F' which permits the latter to move in unison with the former so that the rolls 66 and 66' are always maintained in proper coöperative relation with the chuck 38 irrespective of the various positions which the latter may assume.

The invention has been described in one of its preferred forms but the scope of the invention may be considered to include various specific modifications as the same may be included within the description of the appended claims.

What I claim is—

1. In a metal working apparatus, a frame, a rotatable chuck, die members to successively work the metal held by said chuck, a pivoted frame in which said dies are mounted, one on each side of the pivot, means actuated by fluid pressure to swing said frame on its pivot, and a device to control the last-named means so that first one and then the other d" may be forced against the work and so that both dies may be held away from the work when desired.

2. A barrel machine, comprising in combination, a frame, a reciprocable horizontally arranged bearing shaft, an alined rotatable shaft, a chuck rotatably mounted on the bearing shaft, and a like chuck fixed on the rotatable shaft, power means to reciprocate the first-mentioned shaft and power means to rotate the second mentioned shaft, means to strip the barrel from each of said chucks, movable into and out of barrel stripping position by said shaft, and means to automatically connect and disconnect said shaft and stripping means so that the stroke of the latter is less than that of said shaft.

3. A barrel machine, comprising, a frame, two axially-alined rotatable holding chucks therein, means to move one of the latter to and from the other to grip and release the heads and body of a partially-formed barrel for the head-crimping operations, each of said chucks having a rigid peripheral supporting surface for the overlapped barrel head and body portions, means to rotate said chucks with the assembled barrel therebetween, rotatable crimping rolls or dies movable toward said surfaces to engage the overlapped portions of the barrel head and body and crimp the same during the rotation of the chucks, means actuated by fluid pressure to force said rolls against said portions, a frame to carry the crimping roll for the movable chuck and the roll-actuating means for such chuck, and means to move such frame in unison with its chuck.

4. A barrel machine, comprising, a frame, two axially-alined rotatable holding chucks therein, means to move one of the latter to and from the other to grip and release the heads and body of a partially-formed barrel for the head-crimping operations, each of said chucks having a rigid peripheral supporting surface for the overlapped barrel head and body portions, means to rotate said chucks with the assembled barrel therebetween, rotatable crimping rolls or dies movable toward said surfaces to engage the overlapped portions of the barrel head and body and crimp the same during the rotation of the chucks, means actuated by fluid pressure to force said rolls against said portions, a frame to carry the crimping roll for the movable chuck and the roll-actuating means for such chuck, means to move such frame in unison with its chuck, and mechanism independent of the last-named means to rigidly hold the movable frame in any of the positions to which it is moved.

5. A barrel machine, comprising, a frame, rotatable chucks therein having their axes arranged in a common horizontal line, supporting rolls adapted to hold a barrel body and assembled heads in line to be gripped by said chucks, means to move one chuck toward and away from the other, means to rotate the chucks, crimping rolls, means to force the latter against the work to join the heads and barrel body, and means engageable with the work closely adjacent the periphery of the chucks to strip the former from the latter.

6. A barrel machine, comprising, a frame, rotatable chucks therein having their axes arranged in a common horizontal line, supporting rolls adapted to hold a barrel body and assembled heads in line to be gripped by said chucks, means to move one chuck toward and away from the other, means to rotate the chucks, crimping rolls, means to force the latter against the work to join the heads and barrel body, means to strip the work from the chucks, means to feed the assembled work to the supporting rolls, and means to lift the finished barrel from the latter and eject it from said machine.

7. A barrel machine, comprising in combination, a frame, a reciprocable horizontally arranged bearing shaft, an alined rotatable shaft, a chuck rotatably mounted on the bearing shaft, and a like chuck fixed on the rotatable shaft, power means to reciprocate the first mentioned shaft and power means to rotate the second mentioned shaft, and means to strip the barrel from each of said chucks, operatively connected to said reciprocable shaft to act in timed relation to the movement of the latter.

8. A barrel machine, comprising in combination, a frame, a reciprocable horizontally-arranged bearing shaft, an alined rotatable shaft, a chuck rotatably mounted on the bearing shaft, and a like chuck fixed on the rotatable shaft, power means to reciprocate the first-mentioned shaft and power means to rotate the second-mentioned shaft, means to strip the barrel from each of said chucks, operatively connected to said reciprocable shaft to act in timed relation to the movement of the latter, and operable devices between said reciprocable shaft and stripping means to cause the latter to strip the barrel first from the chuck on the rotatable shaft.

9. A barrel machine, comprising in combination, a frame, a reciprocable horizontally-arranged bearing shaft, an alined rotatable shaft, a chuck rotatably mounted on the bearing shaft, and a like chuck fixed on the rotatable shaft, power means to reciprocate the first-mentioned shaft and power means to rotate the second-mentioned shaft, means to strip the barrel from each of said chucks operatively connected to said reciprocable shaft and to act in timed relation to the movement of the latter, and devices associated with the stripping means to vary the point in the movement of the reciprocable shaft at which such means will act.

10. A barrel machine, comprising, a frame, rotatable and axially-alined chucks therein, supporting rolls upon which a barrel body and assembled heads may be delivered and held in line to be gripped by said chucks, resilient shock-absorbing means to support said rolls, means to move the chucks to and from each other to grip and release the barrel, crimping rolls, and means to force the latter against the work to join the head and barrel body.

11. In a metal working apparatus, a frame, a rotatable chuck, rotatable crimping rolls to successively work the metal held by the chuck, a pivoted frame in which said rolls are mounted one on each side of the pivot, and a cylinder, a piston therein operatively connected to move said frame to force first one roll and then the other against the work as the chuck rotates, and means to equalize the pressure on opposite sides of the piston to hold the frame with both rolls away from the work when said mechanism is idle.

12. A barrel machine, comprising, a frame, axially alined chucks therein, one of which is axially movable and the other held from axial movement, an axially shiftable series of supporting rolls adapted to hold a barrel body and assembled heads in line to be gripped by said chucks, means to move one of the latter toward and away from the other to grip and release the barrel, said rolls being axially movable with the barrel during the gripping operation, means to strip the barrel from the chuck, and means to axially move the rolls in an opposite direction after the barrel has been stripped from said chucks.

HENDERSON G. DAVIS.